(12) United States Patent
Mielenz et al.

(10) Patent No.: US 10,755,435 B2
(45) Date of Patent: Aug. 25, 2020

(54) MICROMECHANICAL SENSOR AND METHOD FOR MANUFACTURING A MICROMECHANICAL SENSOR

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 16/091,064

(22) PCT Filed: Feb. 6, 2017

(86) PCT No.: PCT/EP2017/052487
§ 371 (c)(1),
(2) Date: Oct. 3, 2018

(87) PCT Pub. No.: WO2017/174230
PCT Pub. Date: Oct. 12, 2017

(65) Prior Publication Data
US 2019/0114800 A1 Apr. 18, 2019

(30) Foreign Application Priority Data

Apr. 8, 2016 (DE) .......................... 10 2016 205 868

(51) Int. Cl.
*G06T 7/73* (2017.01)
*G01C 21/20* (2006.01)
(Continued)

(52) U.S. Cl.
CPC ................ *G06T 7/73* (2017.01); *G01C 21/20* (2013.01); *G01C 21/28* (2013.01);
(Continued)

(58) Field of Classification Search
CPC .... G01C 21/20; G01C 21/28; G01C 21/3691; G06K 9/00791; G06K 9/00818;
(Continued)

(56) References Cited

U.S. PATENT DOCUMENTS

| 2005/0149256 A1 | 7/2005 | Lawitzky et al. |
| 2016/0061612 A1* | 3/2016 | You .................... G01C 21/26 701/409 |

(Continued)

FOREIGN PATENT DOCUMENTS

| DE | 102014206901 A1 | 10/2015 |
| DE | 102014214327 A1 | 1/2016 |

(Continued)

OTHER PUBLICATIONS

International Search Report for PCT/EP2017/052487, dated May 10, 2017.

*Primary Examiner* — Mekonen T Bekele
(74) *Attorney, Agent, or Firm* — Norton Rose Fulbright US LLP; Gerard Messina

(57) ABSTRACT

A method for determining a pose of an at least semi-autonomously driving vehicle with the aid of landmarks, the vehicle including detectors, with which the landmarks are detected, and a back-end server being provided, with which the landmark data of the landmarks are transmitted from a map to a vehicle control system of the vehicle, the method including at least the following steps: —communicating detection reports relating to detected landmarks from the vehicle control system to the back-end server, —sending data relating to environmental influences from an information service to the back-end server, which environmental influences have an effect on the detection of landmarks with the aid of the detectors of the vehicle, —statistically evaluating environmental influences on specific types of landmarks and —selecting landmarks as a function of the (Continued)

statistical evaluation and of instantaneous environmental influences and —transmitting the selection of landmarks from the back-end server to the vehicle control system.

8 Claims, 1 Drawing Sheet

(51) Int. Cl.
*G01C 21/36* (2006.01)
*G06K 9/00* (2006.01)
*G01C 21/28* (2006.01)
*G05D 1/00* (2006.01)
*G05D 1/02* (2020.01)
*G06K 9/03* (2006.01)

(52) U.S. Cl.
CPC ..... *G01C 21/3691* (2013.01); *G06K 9/00791* (2013.01); *G05D 1/0088* (2013.01); *G05D 1/0231* (2013.01); *G05D 1/0276* (2013.01); *G05D 2201/0213* (2013.01); *G06K 9/00818* (2013.01); *G06K 9/00825* (2013.01); *G06K 9/03* (2013.01); *G06T 2207/10016* (2013.01); *G06T 2207/10021* (2013.01); *G06T 2207/30244* (2013.01); *G06T 2207/30252* (2013.01); *G06T 2207/30256* (2013.01)

(58) Field of Classification Search
CPC ........ G06K 9/00825; G06K 9/03; G06T 7/73; G06T 2207/10016; G06T 2207/10021; G06T 2207/30244; G06T 2207/30252; G06T 2207/30256; G05D 1/0088; G05D 1/0231; G05D 1/0276; G05D 2201/0213
See application file for complete search history.

(56) References Cited

U.S. PATENT DOCUMENTS

| | | | |
|---|---|---|---|
| 2016/0305794 A1 | 10/2016 | Horita et al. | |
| 2017/0008521 A1* | 1/2017 | Braunstein | G08G 1/096805 |
| 2018/0151066 A1* | 5/2018 | Oba | G01C 21/3407 |
| 2018/0188043 A1* | 7/2018 | Chen | G01C 21/3602 |
| 2019/0145784 A1* | 5/2019 | Ma | G05D 1/0246 |
| | | | 701/448 |
| 2019/0384294 A1* | 12/2019 | Shashua | G08G 1/096805 |

FOREIGN PATENT DOCUMENTS

| | | |
|---|---|---|
| JP | H0798800 A | 4/1995 |
| JP | 2008051612 A | 3/2008 |
| JP | 2015055947 A | 3/2015 |
| JP | 2015184155 A | 10/2015 |
| JP | 2016018238 A | 2/2016 |

\* cited by examiner

MICROMECHANICAL SENSOR AND METHOD FOR MANUFACTURING A MICROMECHANICAL SENSOR

FIELD OF THE INVENTION

The present invention relates to a method for determining a pose of an at least semi-autonomously driving vehicle with the aid of landmarks, the vehicle including detectors with which the landmarks are detected, and a back-end server being provided, with which the landmark data of the landmarks are transmitted from a map to a vehicle control system of the vehicle.

BACKGROUND INFORMATION

A pose is understood in the technical sector to mean the spatial location of an object, namely the position and orientation of an object in a two-dimensional space or in a three-dimensional space.

The method for determining the pose of the vehicle is based at least additionally on landmarks of various types in the surroundings of the vehicle, whereby a pose basis may represent GPS data, for example. Pose data of the vehicle in this case based on GPS data may be augmented with data that are generated based on the recognition of landmarks. The orientation, for example, the driving direction of the vehicle, in particular, may be largely determined with the aid of landmarks. In this case, the accuracy of the determination of the pose of the vehicle based on landmarks is greater than the accuracy of the determination using GPS data. In semi-autonomously driving vehicles, in particular, in future, fully-autonomously driving vehicles, the pure GPS navigation for guiding the vehicle is no longer sufficient and new systems must be applied, which detect the immediate surroundings of the vehicle and assume the guidance of the vehicle, in particular, by recognizing landmarks. The term vehicle control system in this case includes essentially all components that are necessary for detecting the pose, for the evaluation of the data and, finally, for controlling the vehicle. The vehicle control system includes, in particular, detectors such as laser detectors, radar detectors, infrared sensors, capacitive sensors, LIDAR sensors and/or a video image capturing device.

For this purpose, German Published Patent Application No. 10 2014 206 901, for example, describes a method for determining the pose of an at least semi-autonomously driving vehicle in a surrounding area. The situation recognition in this method is based for one on a detection of the surroundings with the aid of a system of surroundings sensors, which includes ultrasonic sensors, laser sensors, radar sensors, infrared sensors and capacitive sensors, LIDAR sensors and/or a video image capturing device. The situation recognition in this case is intended to be based on the detection of objects outside the vehicle when the vehicle is moving in traffic, informers which also point to a particular situation being relevant. These may be, for example, visual markings, objects or boundaries. In addition or alternatively, additional technologies for localization may be used for improving the accuracy of the situation recognition, thus, geodata may be ascertained with the aid of a GPS system or digital maps with landmarks in combination with an odometry. Landmarks in this case are objects in the immediate surroundings of the vehicle, but also traffic signs, for example, such as traffic lights and the like, as well as roadway markings.

Thus, measuring data are used with the aid of detectors as a basis for sensing the surroundings of the vehicle, from which objects may be extracted with the aid of the detector algorithms. Based on these objects, it is possible to model the vehicle surroundings in order, for example, to consequently plan a trajectory for the host vehicle and to make other action decisions.

The quality of the surroundings model is largely a function of the system of surroundings sensors used. These differ in terms of the measuring properties with respect to accuracy and range depending on the system, and their efficiency is generally significantly a function of environmental conditions such as, for example, rain, fog, solar radiation or artificial illumination. For example, a roadway marking on a wet roadway, in particular, during darkness, may not reliably serve as a landmark, since a wet roadway, in particular, during darkness and in wet conditions may reflect, so that corresponding detectors may not be activated, however, other detectors continue to function in these weather conditions, for example, active light sources.

However, the influence factors do not affect all types of landmarks equally. Signal systems, for example, are generally easily detectable regardless of the weather conditions, whereas in the case of visually operating detection systems with actual objects in the immediate surroundings of the vehicle, for example, it is not possible to reliably model corresponding surroundings under all lighting conditions.

In addition to pieces of information based on sensor measurement data of the detectors on or in the vehicle, pieces of information from maps are increasingly used as an important additional source for the pose of the vehicle. These may be transmitted from a central map server or back-end server to the respective vehicle, referred to below simply as a back-end server. The pieces of surroundings information, which have been detected with the aid of the vehicle detectors, are then consolidated in the vehicle control system with the pieces of surroundings information, so that a mostly significantly higher quality for generating a surroundings model is achievable.

If all landmarks from the map are communicated with the aid of the back-end server to the vehicle control system, a significant information density is then created, which puts an unnecessary strain on the capacity of an available bandwidth of the communication channel between the back-end server and the vehicle control system of the vehicle. The computing capacity of the vehicle control system is also limited on the hardware side, so that it is desirable to reduce the amount of data transmitted by the back-end server to the vehicle control system and detector algorithms triggered as a result.

SUMMARY

An object of the present invention is the refinement of a method for determining a pose of at least a semi-autonomously driving vehicle, the method intended to be designed in such a way that a preferably limited amount of data to be processed is transmitted from the back-end server to the vehicle control system. The necessary computing capacity and the amount of data for the vehicle control system are also to be reduced. In the process, it should be possible to be able to guide the semi-autonomously driving vehicle as safely as ever.

The method includes at least the following steps: communicating detection reports relating to detected landmarks from the vehicle control system to the back-end server; sending data relating to environmental influences from an information service to the back-end server, which environmental influences have an effect on the detection of landmarks with the aid of the detectors of the vehicle; statistically evaluating environmental influences on specific types of landmarks and selecting landmarks as a function of the statistical evaluation and of instantaneous environmental influences and transmitting the selection of landmarks from the back-end server to the vehicle control system.

Thus, the present invention is based on the following processes: a landmark-based map is stored in a map memory on the map server or back-end server, and landmarks are transmitted from the back-end server to the vehicle control system in the vehicle. These landmarks may then be detected by the vehicle system via the system of surroundings sensors and may be consolidated with the transmitted landmark data. This so-called matching of the detected landmark data with those from the back-end server enables a localization of the vehicle. Ideally, only those landmarks are transmitted which may also be detected by the vehicle system and which result in a detailed content of the surroundings model on the vehicle side as required.

The ascertainment of landmarks actually needed and landmarks usefully to be transmitted is the aim achieved with the method according to the present invention.

According to the present invention, the vehicle control system sends a detection report for each individual received landmark to the back-end server. The back-end server also receives weather data, for example; additionally still other data may also be received. A statistical analysis of the local relevance of individual landmarks or landmark types is carried out on the basis of the received detection reports and of the additional pieces of information, i.e., weather data, for example. On this basis, reliable conclusions may be drawn about the relevance of landmarks under particular environmental conditions, i.e., for example, weather conditions and time-of-day conditions.

For example, a multitude of various traffic signs may be located in the area of a traffic intersection. In the morning, these are easily detectable with a first detector type, for example, with a stereo video system, due to favorable lighting conditions, and enable an exact localization. While the light conditions are comparable during rush-hour traffic in the morning, the dense traffic nevertheless results in a very high masking rate. Hence, the traffic signs at this time of day are not detectable or only unreliably detectable and are therefore not transmitted to the vehicle. The corresponding type of detector is therefore deactivated. Street lights on the other hand may be detected in spite of the dense traffic due to their height. For this reason, these landmarks are also transmitted in the morning. Because of the less advantageous detector algorithms for the street lights, however, the traffic signs are again transmitted as the density of the traffic decreases. Active light sources, for example, may be used as landmarks during darkness, so that a second type of detector is activated. These rules may be derived by the system according to the present invention from the detection reports and from additional pieces of information relating to the environmental conditions. The principle may be applied both to landmark types such as, for example, traffic signs, as well as to individual landmarks, i.e., for example, a particular traffic sign at a fixed position.

The use of landmarks that may be sensed given corresponding environmental influences results in savings in transmission means resources between the back-end server and the vehicle control system and in savings of memory space in the vehicle control system. If, based on the method according to the present invention, only those landmark data are transmitted by the back-end server to the vehicle control system, which may also be meaningfully utilized by the vehicle control system as a function of the recognized, instantaneous environmental conditions, i.e., primarily as a function of the time of day and of weather influences, in order to generate a surroundings model of appropriately high quality, the overall result is a higher quality of data.

The environmental influences are defined, for example, by the weather, the time of day, the traffic, the visibility, the lighting conditions and/or wet conditions, as well as by street markings, congestion, heavy oncoming traffic, which may mask landmarks, preceding vehicles and the like. The environmental influences are detected with the aid of surroundings sensors of the vehicle and are communicated to the vehicle control system.

In the case of a wet, reflecting road, for example, in particular, during darkness, road markings are ignored, so that corresponding detectors for detecting road markings are not activated and an associated transmission of the specific data from the back-end server to the vehicle control system is also not activated. It may also be provided, for example, not to consider illumination systems, for example, traffic light systems or the illumination of preceding vehicles, in the event of backlight since, in particular, in the case of backlight, a corresponding detection is not meaningfully possible and a corresponding detection quality is not achievable, so that in the case of backlight, for example, signal systems offer only relatively little informational content.

According to the present invention, an information service is provided, with which relevant environmental influences relating to the location of the vehicle are transmitted to the back-end server. One possible information service is in the form of a weather service, for example, which communicates weather data from the location or from the surroundings of the vehicle to the back-end server. There is also the possibility of providing pieces of information from specially equipped additional vehicles, which form the information service.

The detection reports further advantageously contain at least one Boolean variable for each individual received landmark, which indicates a detection or false detection. The communications of false detections, in particular, are important, since a correct statistical evaluation of the effect of environmental influences on specific types of landmarks only becomes possible thereby.

The method according to the present invention is based, in particular, on the fact that the statistical evaluation of environmental influences on specific types of landmarks includes an aggregation of the detection reports, so that with the increasing number of detection reports received, the back-end server is trained with landmarks to be preferred, regardless of the environmental influences. The statistical evaluation is all the more precise, the greater the number of detection reports included and the greater the number of detections or false detections associated with the environmental influences.

According to another advantageous improvement of the method, the selection of the landmark data of particular landmarks to be transmitted from the back-end server is also carried out as a function of localization scenarios. As a result, a further improvement of the vehicle pose may be achieved, and if the amount of landmark data is increased or reduced as a function of localization scenarios depending on the need, this results in the advantage of a smaller volume of data for determining the pose of the vehicle, the volume of data for processing in the vehicle control system itself being reduced, in addition to a reduced transmission rate from the back-end server.

The selection of particular detectors may be made by the vehicle control system so that a switching may occur between various detectors, for example, detectors and associated detector algorithms may be switched on or switched off.

The present invention is further directed to a system that includes a vehicle control system for carrying out a method for determining a pose of an at least semi-autonomously driving vehicle with the aid of landmarks, the vehicle including detectors with which the landmarks are detected, and including a back-end server, with which landmark data of the landmarks are transmitted from a map to a vehicle control system of the vehicle. The system is designed to carry out at least the following steps: communicating detection reports relating to detected landmarks from the vehicle control system to the back-end server; sending data relating to environmental influences from an information service to the back-end server, which environmental influences have an effect on the detection of landmarks with the aid the detectors of the vehicle; statistically evaluating environmental influences on specific types of landmarks and selecting landmarks as a function of the statistical evaluation and of instantaneous environmental influences and transmitting the selection of landmarks from the back-end server to the vehicle control system. Additional features and associated advantages of the method described above are also taken into account for the system, including a vehicle control system and including a back-end server for carrying out the method.

DETAILED DESCRIPTION

Figure 1:
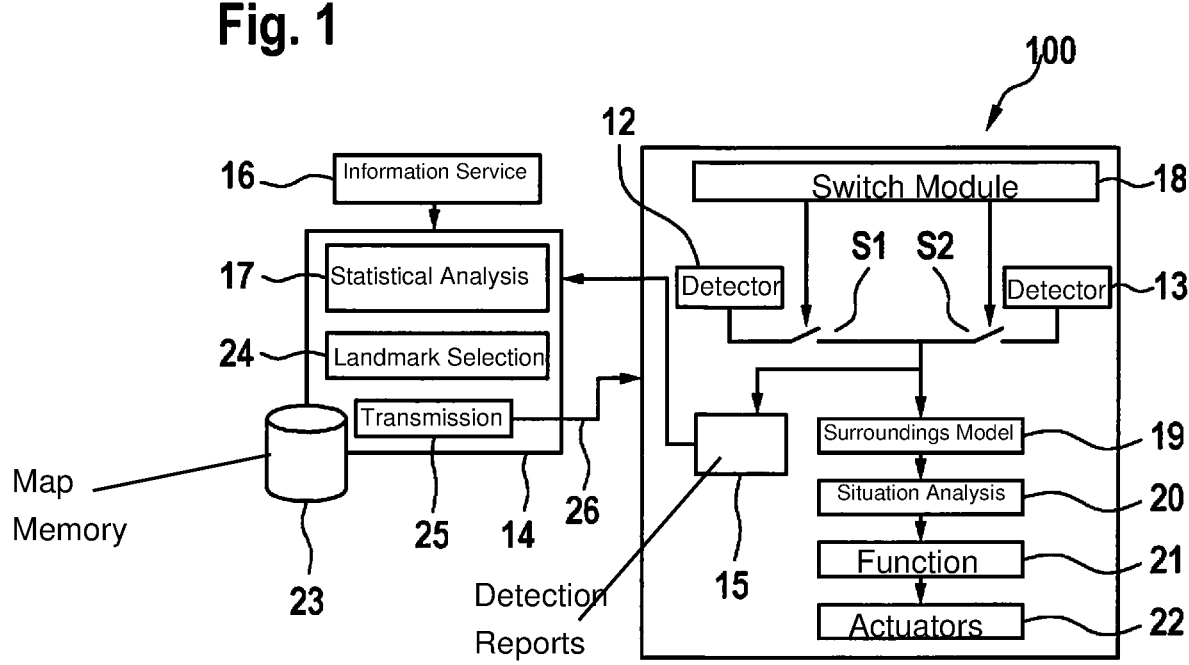
FIG. 1 shows an example of a configuration of a vehicle control system that includes a back-end server for communication with the vehicle control system.

FIG. 1 shows a vehicle control system 100, including a detailed depiction of individual components. Also depicted is a back-end server 14 for receiving detection reports 15 from vehicle control system 100 and for communicating landmark data to vehicle control system 100 with the aid of a communication channel.

Vehicle control system 100 includes multiple detectors 12 and 13, merely two detectors 12, 13 being shown by way of example. With a module 18, it is possible to switch on, switch off or switch over detectors 12, 13 with the aid of switches S1 or S2, regardless of which type of landmarks 10 or 11 is to be recognized.

If either detector 12 or detector 13 or both detectors 12 and 13 is or are activated, a surroundings model 19 may be ascertained so that following a situation analysis 20, a function 21 may finally be provided, with which an action for guiding vehicle 1 is output using a system of actuators 22.

Also schematically shown, in addition to vehicle control system 100, is a back-end server 14. The back-end server is located, for example, at a stationary location outside vehicle 1 and is designed to transmit landmark data, for example, from a map of a map memory 23 to vehicle control system 100. According to the present invention, back-end server 14 receives data from an information service 17 relating to instantaneous environmental influences, such as the weather, if necessary, traffic reports and the like.

In vehicle control system 100, respective detection reports 15 are communicated to back-end server 14, preferably after each detection, which include information about the suitability of the detection. A statistical analysis 17 of the detections is subsequently made in the back-end server 14 in correlation with the information on the environmental influences as a function of the environment influence, i.e., the weather, the time of day, the lighting conditions and the like. As a result of this evaluation, a selection 24 is made in back-end server 14 as to which landmarks 10, 11 are actually suitable for being transmitted to vehicle control system 100 with the aid of a transmission 25. Data relating to landmarks 10, 11, which are less suitable for preparing surroundings model 19, since these data are unable to be detected or recognized by detectors 12, 13, are not transmitted, so that the volume of data is significantly reduced, both in communication channel 26 as well as in the internal processing and storing of the data relating to landmarks 10, 11 within vehicle control system 100, and far fewer detector algorithms are required to be dealt with.

In vehicle control system 100, the pieces of surroundings information, which have been detected with the aid of vehicle detectors 12, 13, are then consolidated with the surroundings information of back-end server 14, so that a higher quality for generating surroundings model 19 is achievable.

Figure 2:
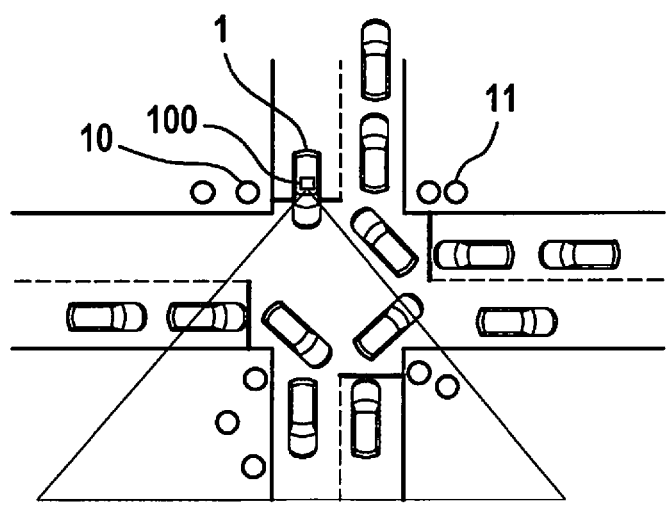
FIG. 2 shows an example of a scenario with a vehicle that includes a vehicle control system and various landmarks being depicted.

FIG. 2 shows an example of a scenario with a vehicle 1 that includes a vehicle control system 100, and with detectors not further depicted, it is possible, for example, to detect landmarks 10 and 11.

Located in the area of the traffic intersection depicted is a multitude of various traffic signs, which define landmarks 10. In the morning, these landmarks are easily detectable with a detector, for example, with a stereo video system, due to favorable lighting conditions, and enable, for example, a highly accurate localization. During the morning rush-hour traffic, the light conditions are comparable, however, the dense traffic results in a very high masking rate. Hence, these traffic signs are not detectable or only unreliably detectable at this time of day and are therefore not transmitted to vehicle 1 and to vehicle control system 100.

Street lights, which form landmarks 11, for example, may be easily detected in spite of the dense traffic due to their height. For this reason, these landmarks 11 are transmitted in the morning. Because of the less advantageous detector algorithms for the street lights, however, the traffic signs are again transmitted as the density of the traffic decreases. Active light sources, for example, may be used as landmarks 11 during darkness. These rules may be derived by the system according to the present invention from detection reports 15 and from additional pieces of information relating to the environmental conditions. The principle may be applied both to landmark types such as traffic signs, as well as to individual landmark types, such as the traffic sign at a particular position.

The present invention is not limited in its implementation to the preferred exemplary embodiment indicated above. Instead, a number of variants are conceivable, which uses the approach depicted even in fundamentally different embodiments. All of the features and/or advantages shown in the description or in the drawings, including design details, spatial configurations and method steps, may be essential to the invention, both alone as well as in a wide variety of combinations.

What is claimed is:

1. A method for determining a pose of an at least semi-autonomously driving vehicle with the aid of landmarks, the vehicle including detectors, with which the landmarks are detected, and a back-end server being provided, with which landmark data of the landmarks are transmitted from a map to a vehicle control system of the vehicle, the method comprising:
communicating detection reports relating to the detected landmarks from the vehicle control system to the back-end server;
sending data relating to at least one environmental influence from an information service to the back-end server, the at least one environmental influence having an effect on the detection of the landmarks with the aid of the detectors of the vehicle;
statistically evaluating the at least one environmental influence on specific types of the landmarks;
determining a selection from the landmarks as a function of the statistical evaluating and of an instantaneous environmental influence; and
transmitting the selection of the landmarks from the back-end server to the vehicle control system.

2. The method as recited in claim 1, wherein the at least one environmental influence includes at least one of a weather, a time of day, traffic, a visibility, a lighting condition, and a wet condition.

3. The method as recited in claim 1, wherein the information service is defined by one of at least one weather service and with an aid of vehicles that transmit data relating to the at least one environmental influence.

4. The method as recited in claim 1, wherein the detection reports for each individual received landmark contains at least one Boolean variable that indicates one of a detection and a false detection.

5. The method as recited in to claim 1, wherein the statistical evaluation of the at least one environmental influence on specific types of landmarks includes an aggregation of the detection reports, so that with increasing number of detection reports received, the back-end server is trained with landmarks to be preferred, regardless of environmental influences.

6. The method as recited in claim 1, wherein the selection of the landmark data of particular landmarks to be transmitted from the back-end server is performed as a function of localization scenarios.

7. The method as recited in claim 1, wherein the vehicle control system one of switches on and switches off the detectors during a determination of the pose of the vehicle.

8. A system, comprising:
a vehicle control system; and
a back-end server, the system carrying out a method for determining a pose of an at least semi-autonomously driving vehicle with the aid of landmarks, the vehicle including detectors, with which the landmarks are detected, the back-end server transmitting landmark data of the landmarks from a map to the vehicle control system of the vehicle, the method comprising:
communicating detection reports relating to the detected landmarks from the vehicle control system to the back-end server;
sending data relating to at least one environmental influence from an information service to the back-end server, the at least one environmental influence having an effect on the detection of the landmarks with the aid of the detectors of the vehicle;
statistically evaluating the at least one environmental influence on specific types of the landmarks;
determining a selection from the landmarks as a function of the statistical evaluating and of an instantaneous environmental influence; and
transmitting the selection of the landmarks from the back-end server to the vehicle control system.

* * * * *

UNITED STATES PATENT AND TRADEMARK OFFICE
CERTIFICATE OF CORRECTION

PATENT NO. : 10,755,435 B2
APPLICATION NO. : 16/091064
DATED : August 25, 2020
INVENTOR(S) : Holger Mielenz et al.

Page 1 of 1

It is certified that error appears in the above-identified patent and that said Letters Patent is hereby corrected as shown below:

On the Title Page

Item (54) and in the Specification, Column 1, Line 1, change the title:
"MICROMECHANICAL SENSOR AND METHOD FOR MANUFACTURING A MICROMECHANICAL SENSOR"

To:
-- METHOD FOR DETERMINING A POSE OF AN AT LEAST SEMI-AUTONOMOUSLY DRIVING VEHICLE WITH THE AID OF LANDMARKS THAT ARE SPECIFICALLY SELECTED AND TRANSMITTED FROM A BACK-END SERVER --

Signed and Sealed this
Tenth Day of November, 2020

Andrei Iancu
*Director of the United States Patent and Trademark Office*